United States Patent
Koshikawa et al.

(10) Patent No.: US 9,769,373 B2
(45) Date of Patent: Sep. 19, 2017

(54) SITUATION COMPREHENDING APPARATUS, SITUATION COMPREHENDING METHOD, AND PROGRAM FOR SITUATION COMPREHENSION

(71) Applicant: OLYMPUS CORPORATION, Tokyo (JP)

(72) Inventors: Mizuki Koshikawa, Hino (JP); Kazumi Ito, Fuchu (JP); Taichiro Kouchi, Hino (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/014,202

(22) Filed: Feb. 3, 2016

(65) Prior Publication Data
US 2016/0223883 A1 Aug. 4, 2016

(30) Foreign Application Priority Data

Feb. 3, 2015 (JP) ................................. 2015-019508

(51) Int. Cl.
*H04N 5/232* (2006.01)
*G03B 13/36* (2006.01)

(52) U.S. Cl.
CPC ......... *H04N 5/23212* (2013.01); *G03B 13/36* (2013.01)

(58) Field of Classification Search
CPC ........... H04N 5/23212; H04N 5/23293; G03B 13/20; G03B 13/34; G03B 13/36
See application file for complete search history.

(56) References Cited

U.S. PATENT DOCUMENTS

| 2004/0183939 A1* | 9/2004 | Nonaka | H04N 5/23212 348/349 |
| 2010/0238325 A1* | 9/2010 | Hoshino | H04N 5/272 348/239 |
| 2011/0268369 A1* | 11/2011 | Richards | G06T 5/005 382/284 |

(Continued)

FOREIGN PATENT DOCUMENTS

JP 2013-160879 A 8/2013

*Primary Examiner* — Luong T Nguyen
(74) *Attorney, Agent, or Firm* — Scully, Scott, Murphy & Presser, P.C.

(57) ABSTRACT

A situation comprehending apparatus included in an imaging apparatus includes an image acquiring section, a structure specifying section, a distance acquiring section, a main subject specifying section, and a main subject distance distribution determining section. The image acquiring section acquires an image of a target scene. The structure specifying section specifies a structure having linear image information in a far or near direction of the target scene or in a direction perpendicular to the far or near direction. The distance acquiring section acquires a distance to a structure straight line included in the structure. The main subject specifying section specifies a main subject different from the structure included in the image. The main subject distance distribution determining section determines distance distribution to the main subject with use of an image of the structure and an image of the main subject.

21 Claims, 11 Drawing Sheets

(56) References Cited

U.S. PATENT DOCUMENTS

| | | | |
|---|---|---|---|
| 2012/0206619 A1* | 8/2012 | Nitta | H04N 5/23219 |
| | | | 348/222.1 |
| 2015/0109474 A1* | 4/2015 | Saruta | G06K 9/00664 |
| | | | 348/222.1 |

* cited by examiner

SITUATION COMPREHENDING APPARATUS, SITUATION COMPREHENDING METHOD, AND PROGRAM FOR SITUATION COMPREHENSION

CROSS-REFERENCE TO RELATED APPLICATION

The present application is based upon and claims the benefit of priority from Japanese Patent Application No. 2015-019508 filed on Feb. 3, 2015. The content of Japanese Patent Application No. 2015-019508 is incorporated by reference.

BACKGROUND

Technical Field

The present invention relates to a situation comprehending apparatus, a situation comprehending method, and a program for situation comprehension.

Description of the Related Art

In general, an auto-focus function, in which an attention subject is automatically focused, is known in an imaging apparatus. For example, Japanese Patent Application Laid-open Publication No. 2013-160879 A discloses a technique relating to tracking movement of a subject and focusing the subject. Japanese Patent Application Laid-open Publication No. 2013-160879 A discloses an imaging apparatus comprising a region detecting means, a position change detecting means, and a determining means. The region detecting means calculates a feature quantity per feature in an image and detects at least two regions defined by the feature quantities. The position change detecting means detects positional changes at the at least two regions between frames. The determining means determines whether or not a distance to the subject has been changed based on a detection result provided by the position change detecting means. Japanese Patent Application Laid-open Publication No. 2013-160879 A discloses that, according to the technique, it is possible to predict whether a focusing direction is a front focus or a rear focus.

In the auto-focus operation, there is a situation in which it is difficult to obtain a focused state such as a backlight case and a case in which contrast of the subject is low. Even in such a case, quick auto-focusing is required. To achieve the quick auto-focusing, a distance to the subject needs to be obtained.

An object of the present invention is to provide a situation comprehending apparatus, a situation comprehending method, and a program for situation comprehension enabling a distance to a subject to be estimated in various situations.

SUMMARY

According to an aspect of the present invention, a situation comprehending apparatus comprises an image acquiring section acquiring an image of a target scene, and a structure specifying section specifying a structure having linear image information in a far or near direction of the target scene or in a direction perpendicular to the far or near direction.

According to an aspect of the present invention, a situation comprehending method comprises acquiring an image of a target scene, and specifying a structure having linear image information in a far or near direction of the target scene or in a direction perpendicular to the far or near direction.

According to an aspect of the present invention, a program for situation comprehension has a computer execute operations comprising acquiring an image of a target scene, and specifying a structure having linear image information in a far or near direction of the target scene or in a direction perpendicular to the far or near direction.

According to the present invention, it is possible to provide a situation comprehending apparatus, a situation comprehending method, and a program for situation comprehension enabling a distance to a subject to be estimated in various situations.

DETAILED DESCRIPTION

First Embodiment

Figure 1:
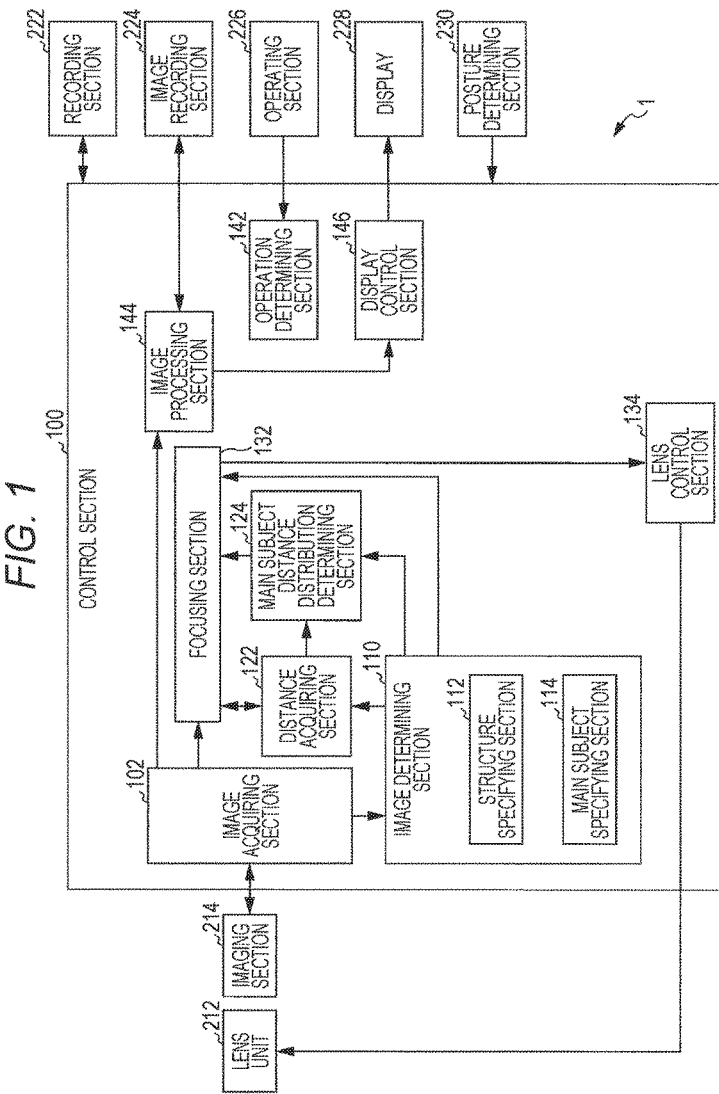
FIG. 1 is a block diagram illustrating a schematic configuration of an imaging apparatus according to a first embodiment.

A first embodiment of the present invention will be described with reference to the drawings. FIG. 1 illustrates a schematic configuration of an imaging apparatus 1 according to the present embodiment. As illustrated in FIG. 1, the imaging apparatus 1 comprises a control section 100, a lens unit 212, an imaging section 214, a recording section 222, an image recording section 224, an operating section 226, a display 228, and a posture determining section 230.

The control section 100 as a hardware is configured to perform various calculations comprising control of operations of respective sections of the imaging apparatus 1 and image processing. The control section 100 comprises a central processing unit (CPU), an application specific integrated circuit (ASIC), or the like. The control section 100 may be constituted by one CPU or the like or combination of a plurality of CPUs, ASICs, or the like. The control section 100 is operated in accordance with a program recorded in the recording section 222 or a recording area in the control section 100. The control section 100 will be described in detail below.

The lens unit 212 comprises a plurality of lenses and forms an image of a subject on an imaging surface of an imaging device comprised in the imaging section 214. The lens unit 212 comprises a focusing lens for focusing. The focusing lens comprises one or more lenses. The lens unit 212 can perform focusing at various positions from infinity to close focus depending on the position of the focusing lens. The lens configuration and the number of lenses of the lens unit 212 are not particularly limited.

The imaging section 214 comprises the imaging device, an A/D converter, and the like. The imaging device can be a CCD, a CMOS, or any kind of imaging sensor. The imaging section 214 is configured to generate an image data based on the subject image formed by the lens unit 212. The generated image data is output to the control section 100.

The recording section 222 is configured to record a program and various parameters for use in operations of the control section 100. The image recording section 224 is configured to record image data generated in the imaging section 214 and undergoing image processing in the control section 100. The image recording section 224 comprises a non-volatile recording medium removable from the imaging apparatus 1, for example. The recording section 222 and the image recording section 224 can be a memory or any kind of hardware that is configured to record something.

The operating section 226 comprises various members for input such as a button, a slider, a dial, and a touch panel. The operating section 226 comprises a release switch adapted to input an image capturing operation and a mode selecting dial adapted to select an image capturing mode and a replaying mode, for example.

The display 228 displays images obtained by imaging and various kinds of information under control of the control section 100. The display 228 can comprise a liquid crystal display, for example. For a display device comprised in the display 228, another display device such as an organic EL display may be used instead of the liquid crystal display.

The posture determining section 230 as a hardware is configured to detect a posture of the imaging apparatus 1. The posture determining section 230 can comprise an acceleration sensor and a magnetic sensor, for example. Inclination of the imaging apparatus 1 is derived based on detected acceleration, and a direction in which the imaging apparatus 1 faces is derived based on detected magnetic energy. The posture determining section 230 outputs information about acceleration and magnetic energy to the control section 100. The posture of the imaging apparatus 1 is specified based on the information, and a horizontal direction or a vertical direction is specified based on this posture. The horizontal direction or the vertical direction obtained in this manner is used when a horizontal or vertical line of a structure described below is specified. Obviously, such a function of specifying the horizontal or vertical line of the structure (a function of detecting a gravity direction or a direction perpendicular to the direction) can be substituted with determining the sky, the horizon, character arrangement, and a standing form and facial features of a person from an image. That is, the posture determining section 230 may be configured to enable the posture to be determined based on an imaging result. Meanwhile, in a case in which a structure specifying section 112 can estimate the posture of the imaging apparatus 1 based on characteristics of a structure when the structure specifying section 112 specifies the structure, the posture determining section 230 may be omitted. Also, in other embodiments described below, the posture determining section 230 is not necessarily an essential component. The posture determining section 230 can be implemented by the control section 100.

The control section 100 can be configured to implement an image acquiring section 102, an image determining section 110, a distance acquiring section 122, a main subject distance distribution determining section 124, a focusing section 132, a lens control section 134, an operation determining section 142, an image processing section 144, and a display control section 146.

The image acquiring section 102 is configured to control operations of the imaging section 214 and acquire from the imaging section 214 data regarding a captured image obtained by imaging.

The image determining section 110 is configured to determine the image. More specifically, the image determining section 110 is configured to acquire the data of the captured image from the image acquiring section 102 and analyze the subject comprised in the image. The image determining section 110 comprises the structure specifying section 112 and a main subject specifying section 114. The structure specifying section 112 specifies a structure comprised in the captured image. For example, based on a predetermined definition of the "structure," the structure specifying section 112 may specify 1) whether or not a structure exists in the data of the captured image, 2) in a case in which the structure exists, in which position in the data of the captured image and in which shape the structure exists, and 3) in a case in which a plurality of structures exist, in which arrangement the plurality of structures exist three-dimensionally. Also, the structure specifying section 112 may specify artificially assembled buildings and vehicles; parts, exteriors, and interiors thereof (walls, ceilings, windows, built-in shelves, and illuminations); furniture pieces, tools, and in-room desks and storages thereof; and three-dimensional structures such as roads, utility poles, traffic lights, and signs. A primary characteristic of each of such three-dimensional structures is that it has braces and poles erected approximately in a vertical direction to the ground to keep its shape on the ground against the force of gravity. Also, in many cases, to help the plurality of poles to receive uniform forces and to prevent upper objects from falling, beams are provided in a direction vertical to the poles or a direction horizontal to the ground, and wall surfaces are provided along these beams. Linear image information pieces (structure straight lines) such as outline portions of these members are often perpendicular to each other from the following reason. That is, a mere wall surface consisting only of poles and a wall would collapse and would provide no living space, no space for arranging goods, or no working space. Thus, each structure is often formed in a rectangular solid by providing similar poles and beams to be opposed to each other. For example, in a case of a building, walls, ceilings, windows, illuminations, and furniture pieces are formed in quadrangular shapes extending in directions matched with directions of the poles and beams, and the furniture pieces such as shelves, doors, drawers, and screens similarly have many linear portions defined horizontally or vertically to the ground. Many of the furniture pieces and tools housed in the aforementioned rectangular solid are in quadrangular shapes as seen in the vertical direction.

Accordingly, many of rooms and corridors are quadrangles or combined quadrangles. In an outdoor location, roads, or utility poles or signs scattered on the roads, are installed to have approximately equal widths. They can be specified as the "structure" through determination of the aforementioned gravity direction and relations among straight lines constituting the structure. Such a structure has various kinds of information since it has straight lines having obvious specific rules such as having an equal width, extending in a far or near direction, and spreading in a direction perpendicular to the far or near direction and is convenient especially for obtaining information in the far or near direction. For example, the structure specifying section 112 specifies a window frame comprised in the captured image. Although the structure specified by the structure specifying section 112 is not limited to the window frame but may be any of various structures such as a structure existing indoor such as a pole, a beam and a desk and a structure existing outdoor such as a building as described above, the window will be taken as a simplest example (in terms of description of a scene and a detecting method) herein. The window is a typical example of the structure having the straight lines having the obvious specific rules such as having the equal width, extending in the far or near direction, spreading in the direction perpendicular to the far or near direction, and having the information. The main subject specifying section 114 specifies a main subject. More specifically, the main subject specifying section 114 may specify a state of the main subject. For example, the main subject specifying section 114 may specify at least any one of brightness of the main subject, a characteristic of illumination light to the main subject, and contrast of the main subject. Here, the main subject may be a part of a subject specified by the main subject specifying section 114 in accordance with a predetermined specifying method or a part of a main subject that a person who takes pictures wishes to focus at the time of photographing and that is selected by the person who takes pictures.

The distance acquiring section 122 is configured to acquire a distance to the structure specified in the structure specifying section 112. The distance acquiring section 122 is configured to acquire the distance from the imaging apparatus 1 (more specifically, imaging device comprised in the imaging section 214) to the structure by focusing the structure, for example. Meanwhile, the distance acquiring section 122 may acquire distance distribution from the imaging apparatus 1 to the structure. For example, in a case in which the structure specifying section 112 specifies a plurality of structures, the distance acquiring section 122 may acquire information about positional relationship among the plurality of structures based on how the structures specified in the structure specifying section 112 overlap with each other.

The main subject distance distribution determining section 124 is configured to determine distance distribution to the main subject based on the main subject (or the state of the main subject) specified in the main subject specifying section 114 and the distance to the structure acquired in the distance acquiring section 122. More specifically, the main subject distance distribution determining section 124 is configured to determine an index of a distance from the imaging apparatus 1 (more specifically, the imaging device comprised in the imaging section 214) to the main subject. For example, the main subject distance distribution determining section 124 may determine whether the main subject exists in a position located nearer the imaging apparatus 1 or farther from the imaging apparatus 1 than the structure specified in the structure specifying section 112. More preferably, the main subject distance distribution determining section 124 may be configured to determine the distance from the imaging apparatus 1 to the main subject. Also, the main subject distance distribution determining section 124 may be configured to determine the index of the distance from the imaging apparatus 1 to the main subject more specifically in accordance with predetermined conditions defined in advance in the control section 100. For example, in a case in which the main subject distance distribution determining section 124 is configured to determine that the main subject exists in a position located nearer the imaging apparatus 1 than the structure specified in the structure specifying section 112, the main subject distance distribution determining section 124 may be configured to determine that the main subject is located in a center position between the imaging apparatus 1 and the structure specified in the structure specifying section 112.

The focusing section 132 is configured to derive a position of the focusing lens in the lens unit 212 adapted to focus the subject based on an evaluation value of contrast of the image, for example. The focusing section 132 is configured to focus the main subject and focus the structure in cooperation with the distance acquiring section 122. Also, the focusing section 132 is configured to use the distance distribution to the main subject determined in the main subject distance distribution determining section 124 to focus the main subject. In this case, the focusing section 132 may be configured to use the index of the distance from the imaging apparatus 1 to the main subject. The focusing section 132 is configured to output the position of the focusing lens in the lens unit 212 for focusing to the lens control section 134. Meanwhile, for auto-focusing performed in the focusing section 132, not only the contrast detecting method but also various methods such as a phase difference detecting method can be used.

The lens control section 134 is configured to acquire information about the position of the focusing lens in the lens unit 212 from the focusing section 132 and is configured to control operations of the focusing lens in the lens unit 212 based on the information. In this manner, the focusing section 132 and the lens control section 134 can be configured to function as auto-focus control sections controlling the auto-focus operations.

The operation determining section 142 is configured to detect an operation to the operating section 226 and is configured to transmit obtained operating information to the respective sections in the control section 100. Meanwhile, in FIG. 1, illustration of lines connected from the operating section 226 to the respective sections is omitted.

The image processing section 144 is configured to acquire a captured image from the image acquiring section 102 and is configured to perform various image processing operations to this captured image. The image processing section 144 is configured to output image data after image processing to the display control section 146 to have an image displayed on the display 228 based on the processed image data. The image processing section 144 also can obtain the processed image data recorded in the image recording section 224, for example.

The display control section 146 is configured to acquire the image data from the image processing section 144 and is configured to obtain the image displayed on the display 228 based on the data.

Figure 2:
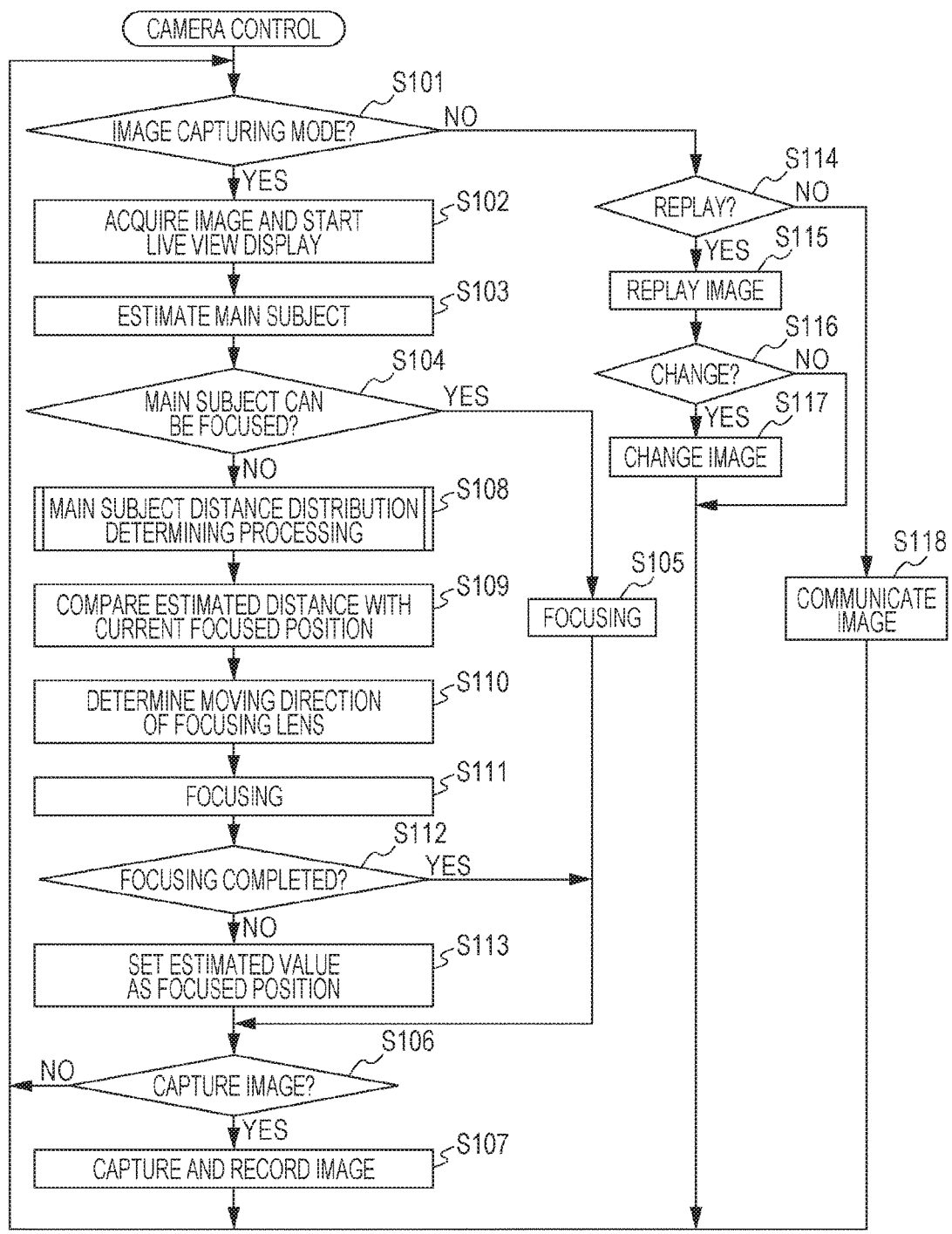
FIG. 2 is a flowchart illustrating an example of camera control processing according to the first embodiment.

Next, operations of the imaging apparatus 1 according to the present embodiment will be described. An overview of processing regarding camera control of the imaging apparatus 1 will be described with reference to a flowchart in FIG. 2.

In step S101, the control section 100 is configured to determine whether or not the mode is an image capturing mode for capturing images. The mode is input with use of the mode selecting dial in the operating section 226. When the mode is the image capturing mode, the processing proceeds to step S102.

In step S102, the control section 100 is configured to acquire image data from the imaging section 214 and is configured to perform image processing to the image data. The control section 100 is configured to obtain the processed image displayed on the display 228 to execute display of a live view image. Hereinbelow, an image obtained in the imaging section 214 will be referred to as a captured image.

In step S103, the control section 100 specifies a main subject comprised in the live view image. The main subject may be a subject at the center of the captured image, for example. Alternatively, the main subject may be a subject specified by pattern matching such as face detection or may be a subject that is being tracked with use of a subject tracking technique. The main subject may also be a subject selected by a person who takes pictures. In the following description, a case in which the main subject is regarded as one located at the center of the captured image will be taken as an example.

In step S104, the control section 100 is configured to determine whether or not the main subject can be focused. When the main subject can be focused, the processing proceeds to step S105. In step S105, the control section 100 performs processing for focusing. That is, the control section 100 is configured to operate the focusing lens to focus the main subject. In the focusing, the contrast detecting method can be used, for example. The processing thereafter proceeds to step S106. Meanwhile, main subject distance distribution determining processing may be executed absolutely after the main subject is specified. In this case, step S104 may be omitted.

In step S106, the control section 100 is configured to determine whether or not the image capturing operation such as pressing the release switch in the operating section 226 has been performed. When the image capturing operation is not performed, the processing returns to step S101. Conversely, when the image capturing operation has been performed, the processing proceeds to step S107.

In step S107, the control section 100 is configured to perform image capturing processing. That is, the control section 100 is configured to have the imaging section 214 perform the image capturing processing and is configured to acquire image data from the imaging section 214. The control section 100 is configured to perform image processing to the acquired image data and is configured to record the processed image data in the image recording section 224. The processing thereafter returns to step S101.

When it is determined in step S104 that the main subject cannot be focused, the processing proceeds to step S108. For example, in a case in which a photographing situation is a backlight situation, or in which contrast of the main subject is low, focusing is kept unsuccessful, and it is determined that focusing cannot be performed.

In step S108, the control section 100 is configured to perform the main subject distance distribution determining processing. The main subject distance distribution determining processing is processing of determining distance distribution to the main subject. More specifically, the main subject distance distribution determining processing is processing of determining an index of a distance from the imaging apparatus 1 to the main subject with use of characteristics of a structure.

Figure 3:
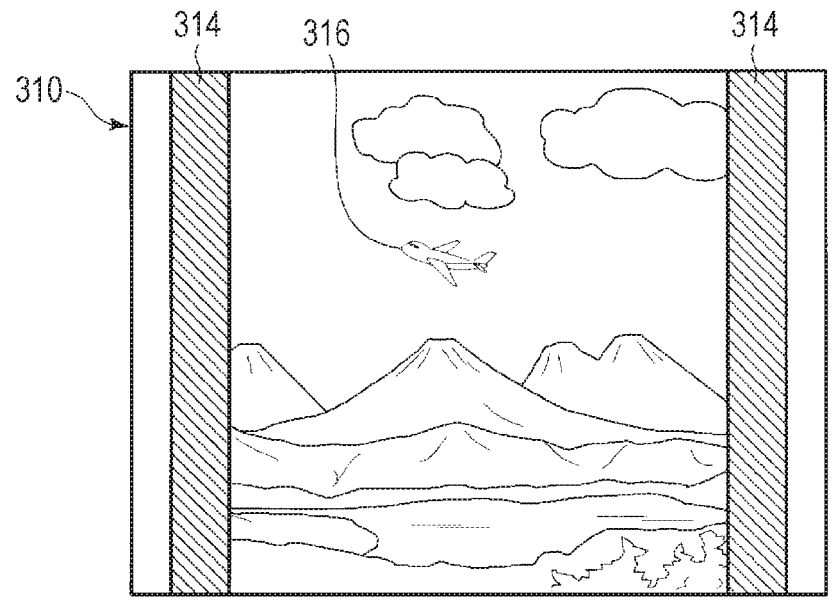
FIG. 3 describes an example of a photographing situation according to the first embodiment.
Figure 4:
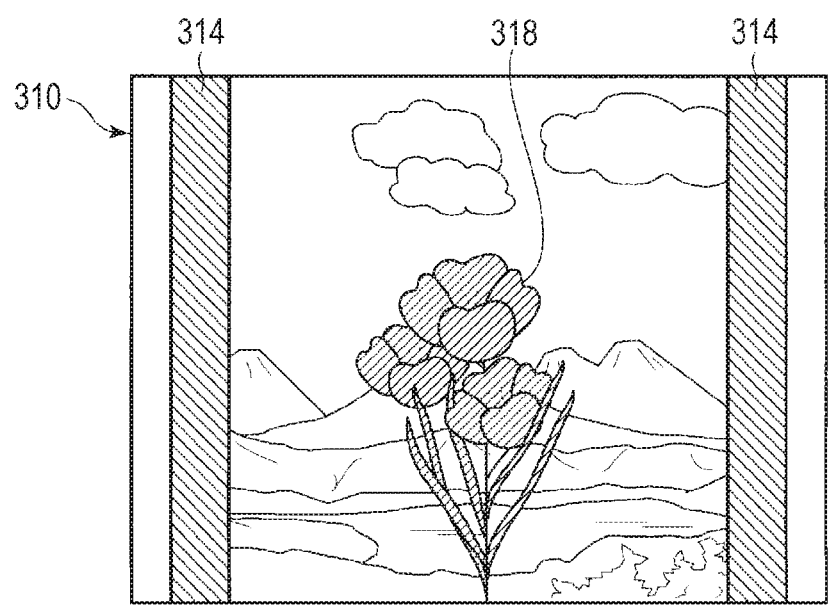
FIG. 4 describes an example of the photographing situation according to the first embodiment.

For example, a situation illustrated in FIG. 3 and a situation illustrated in FIG. 4 are considered. An outer frame in FIG. 3 or 4 represents an imaging region 310 in which an image is acquired by the imaging section 214. The image in this imaging region 310 comprises a window frame 314. A situation illustrated in FIG. 3 is a situation in which an airplane 316 existing behind the window is regarded as a main subject, and in which the airplane 316 is to be focused. A situation illustrated in FIG. 4 is a situation in which a bunch of flowers 318 existing in front of the window is regarded as a main subject, and in which the bunch of flowers 318 is to be focused. In the situation illustrated in FIG. 3, the airplane 316 is located farther than the window frame 314. In the situation illustrated in FIG. 4, the bunch of flowers 318 is located nearer than the window frame 314. In the main subject distance distribution determining processing, a structure such as the window frame is specified, and information of whether the main subject is farther or nearer than the structure is acquired. The main subject distance distribution determining processing will be described further in detail below.

When a determination value of the index of the distance from the imaging apparatus 1 to the main subject has been acquired in the main subject distance distribution determining processing, the processing proceeds to step S109. In step S109, the control section 100 is configured to compare the determined distance from the imaging apparatus 1 to the main subject with a focusing distance at a current position of the focusing lens. In step S110, the control section 100 is configured to determine a moving direction of the focusing lens based on a comparison result in step S109. In step S111, the control section 100 is configured to perform focusing processing. At this time, information regarding the moving direction of the focusing lens determined in step S110 is used. The focusing is performed by, in a case of using the contrast detecting method, for example, analyzing changes of an evaluation value of contrast along with movement of the focusing lens and searching a position of the focusing lens at which the evaluation value of contrast is maximum. Here, using the moving direction determined in step S110 reduces a searching range to check whether or not the main subject is focused and enables quicker focusing to be achieved.

In step S112, the control section 100 is configured to determine whether or not the focusing has been completed, that is, whether or not the main subject has been focused. When the focusing is successful, the processing proceeds to step S106. Conversely, when the focusing is unsuccessful, the processing proceeds to step S113.

In step S113, the control section 100 is configured to set the determination value of the index of the distance from the imaging apparatus 1 to the main subject estimated in step S108 as a value at a focused position. The processing thereafter proceeds to step S106.

When it is determined in step S101 that the mode is not an image capturing mode, the processing proceeds to step S114. Detailed description of operations other than those in the image capturing mode will be omitted, and brief description thereof will be provided. In step S114, the control section 100 is configured to determine whether or not the mode is a replaying mode. When the mode is the replaying mode, the processing proceeds to step S115. In step S115, the control section 100 replays the image. That is, the control section 100 is configured to read out the image data from the image recording section 224 and is configured to have the image displayed on the display 228. In step S116, the control section 100 is configured to determine whether or not an instruction of changing the replayed image has been input, that is, whether or not the displayed image is to be changed. When the replayed image is not to be changed, the processing returns to step S101. Conversely, when the replayed image is to be changed, the processing proceeds to step S117. In step S117, the control section 100 is configured to change the replayed image. That is, the control section 100 is configured to read other image data from the image recording section 224 and is configured to have the image displayed on the display 228. The processing thereafter returns to step S101.

When it is determined in step S114 that the mode is not the replaying mode, the processing proceeds to step S118. In step S118, the control section 100 is configured to communicate with another apparatus to transmit or receive images. The processing thereafter returns to step S101.

Figure 5:
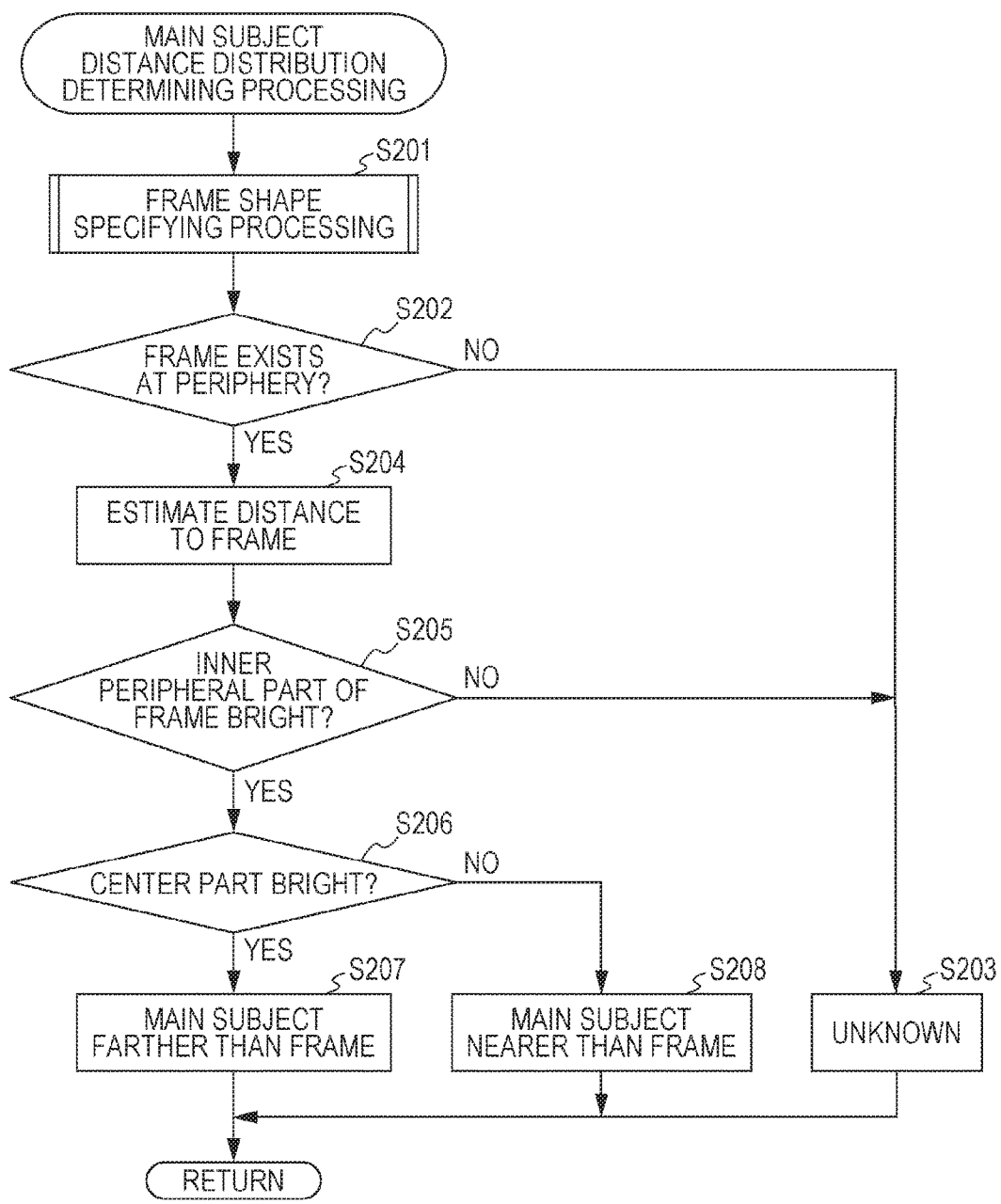
FIG. 5 is a flowchart illustrating an example of main subject distance distribution determining processing according to the first embodiment.

Next, the main subject distance distribution determining processing performed in step S108 will be described with reference to a flowchart illustrated in FIG. 5.

In step S201, the control section 100 is configured to perform structure specifying processing. In the present embodiment, frame shape specifying processing will be described as a mode of the structure specifying processing.

Figure 6:
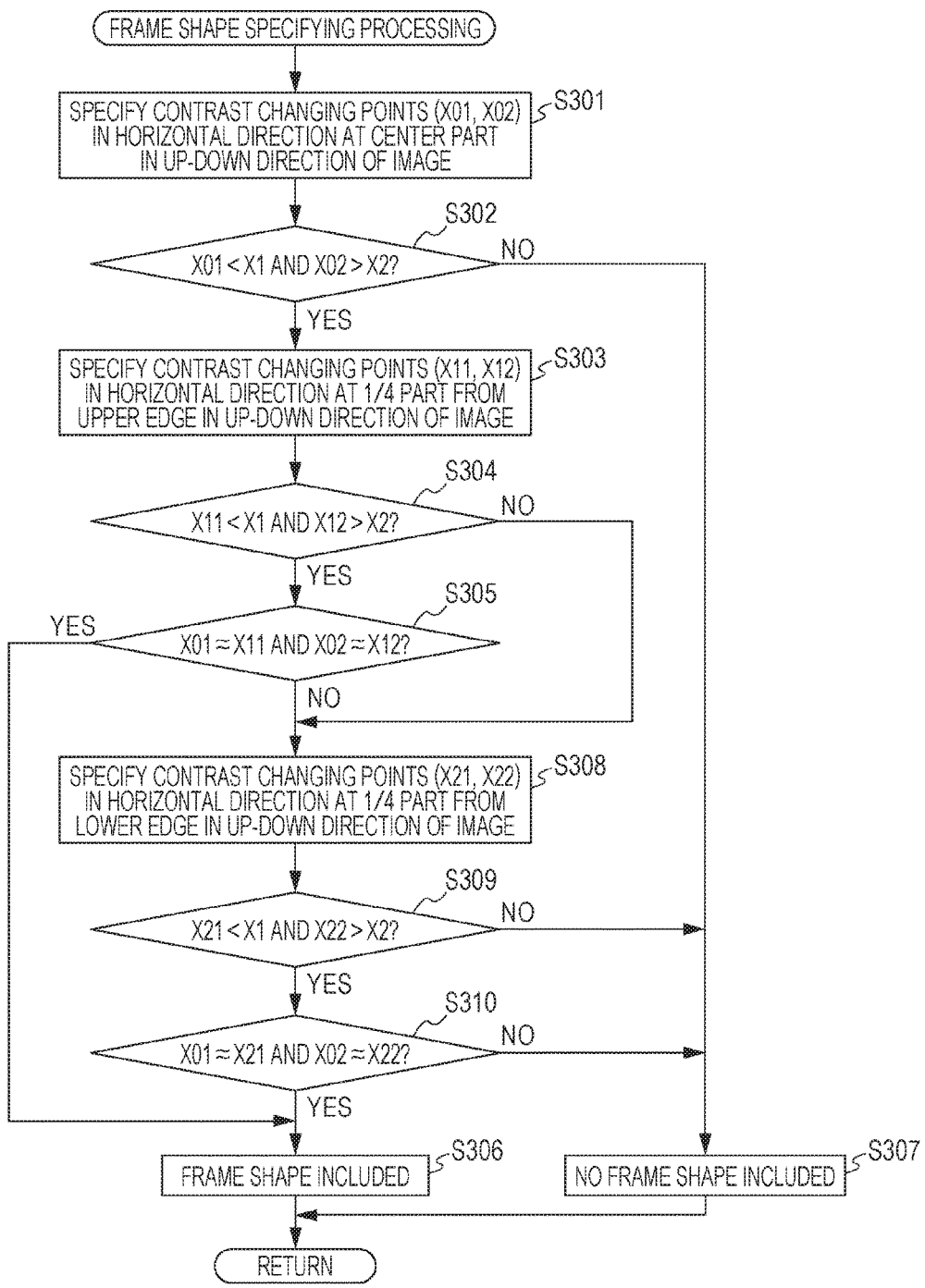
FIG. 6 is a flowchart illustrating an example of frame shape specifying processing according to the first embodiment.

The frame shape specifying processing is processing of specifying a structure formed in a frame shape comprises in a live view image. The frame shape specifying processing will be described with reference to a flowchart illustrated in FIG. 6.

In step S301, the control section 100 is configured to measure a contrast value in the horizontal direction or a direction of an X axis from a center part in an up-down direction of the image or a center point in a direction of a Y axis to specify contrast changing points, each of which is a point at which contrast changes. Here, the contrast changing points are sequentially searched from the center to the right and the left, and a coordinate point on the left side at which a change in brightness has been detected is X01 while a coordinate point on the right side at which a change in brightness has been detected is X02. The reason for searching the contrast changing points from the center is that the main subject is assumed to reside at the center part and that a frame-shaped structure surrounding the main subject is desired to be specified.

In step S302, the control section 100 is configured to determine whether or not X01 is smaller than a predetermined value X1 and whether or not X02 is larger than a predetermined value X2. That is, it is determined whether or not the contrast changing point detected on the left side is located further on the left side than a predetermined position and whether or not the contrast changing point detected on the right side is located further on the right side than a predetermined position. When X01 is smaller than the predetermined value X1, and X02 is larger than the predetermined value X2, the processing proceeds to step S303. Here, the predetermined values X1 and X2 are values preset in the imaging apparatus 1 or values preset by a person who takes pictures or the like. For example, the predetermined value X1 can be set at a position away from a left edge of the image by 20% of a horizontal width of the image. Also, the predetermined value X2 can be set at a position away from a right edge of the image by 20% of the horizontal width of the image.

In step S303, the control section 100 measures the contrast value in the horizontal direction or the direction of the X axis at a ¼ part from an upper edge in the up-down direction of the image to specify the contrast changing points, each of which is a point at which contrast changes. Here, the contrast changing points are sequentially searched from the center to the right and the left, and a coordinate point on the left side at which a change in brightness has been detected is X11 while a coordinate point on the right side at which a change in brightness has been detected is X12.

In step S304, the control section 100 is configured to determine whether or not X11 is smaller than the predetermined value X1 and whether or not X12 is larger than the predetermined value X2. When X11 is smaller than the predetermined value X1, and X12 is larger than the predetermined value X2, the processing proceeds to step S305.

In step S305, the control section 100 is configured to determine whether or not a difference between X01 and X11 is smaller than a predetermined value and whether or not a difference between X02 and X12 is smaller than the predetermined value. When each of the differences between X01 and X11 and between X02 and X12 is smaller than the predetermined value, the processing proceeds to step S306. That is, when the contrast changing points are found on the right and the left as a result of measuring the contrast value in the horizontal direction at the center part and at the ¼ part from the upper edge in the up-down direction of the image, a line connecting the contrast changing points found on the left side is approximately parallel to a left edge, and a line connecting the contrast changing points found on the right side is approximately parallel to a right edge, the processing proceeds to step S306.

In step S306, the control section 100 is configured to conclude that the image comprises a frame shape. The frame shape specifying processing thereafter ends, and the processing returns to the main subject distance distribution determining processing.

When it is determined in step S302 that X01 is not smaller than the predetermined value X1 or that X02 is not larger than the predetermined value X2, the processing proceeds to step S307. In step S307, the control section 100 is configured to conclude that the image comprises no frame shape. The frame shape specifying processing thereafter ends, and the processing returns to the main subject distance distribution determining processing.

When it is determined in step S304 that X11 is not smaller than the predetermined value X1 or that X12 is not larger than the predetermined value X2, the processing proceeds to step S308. Also, when it is determined in step S305 that the difference between X01 and X11 is smaller than the predetermined value and that the difference between X02 and X12 is not smaller than the predetermined value, the processing proceeds to step S308.

In step S308, the control section 100 is configured to measure the contrast value in the horizontal direction or the direction of the X axis at a ¼ part from a lower edge in the up-down direction of the image to specify the contrast changing points, each of which is a point at which contrast changes. Here, the contrast changing points are sequentially searched from the center to the right and the left, and a coordinate point on the left side at which a change in brightness has been detected is X21 while a coordinate point on the right side at which a change in brightness has been detected is X22.

In step S309, the control section 100 is configured to determine whether or not X21 is smaller than the predetermined value X1 and whether or not X22 is larger than the predetermined value X2. When X21 is smaller than the predetermined value X1, and X22 is larger than the predetermined value X2, the processing proceeds to step S310.

In step S310, the control section 100 is configured to determine whether or not a difference between X01 and X21 is smaller than the predetermined value and whether or not a difference between X02 and X22 is smaller than the predetermined value. When each of the differences between X01 and X21 and between X02 and X22 is smaller than the predetermined value, the processing proceeds to step S306. That is, when the contrast changing points are found on the right and the left as a result of measuring the contrast value in the horizontal direction at the center part and at the ¼ part from the lower edge in the up-down direction of the image, a line connecting the contrast changing points found on the left side is approximately parallel to the left edge, and a line connecting the contrast changing points found on the right side is approximately parallel to the right edge, the processing proceeds to step S306. In other words, it is concluded that the image comprises a frame shape.

When it is determined in step S309 that X21 is not smaller than the predetermined value X1 or that X22 is not larger than the predetermined value X2, the processing proceeds to step S307. Also, when it is determined in step S310 that the difference between X01 and X21 is smaller than the predetermined value and that the difference between X02 and X22 is not smaller than the predetermined value, the processing proceeds to step S307. In other words, in these cases, it is concluded that the image comprises no frame shape.

Meanwhile, although a case in which a structure extending in the vertical direction is specified has been taken as an example herein, a structure extending in the horizontal direction such as upper and lower edges of a window frame can also be detected in a similar manner.

Returning to FIG. 5, description of the main subject distance distribution determining processing will be continued. After the frame shape specifying processing in step S201, the processing proceeds to step S202. In step S202, the control section 100 is configured to determine whether or not a frame exists at a peripheral part of the image. When it is determined that no frame exists, the processing proceeds to S203. In step S203, the control section 100 is configured to conclude that the distance to the main subject is unknown. The main subject distance distribution determining processing thereafter ends, and the processing returns to the camera control processing.

When it is determined in step S202 that the frame exists, the processing proceeds to step S204. In step S204, the control section 100 is configured to acquire a distance from the imaging apparatus 1 to the detected frame. The distance from the imaging apparatus 1 to the detected frame is derived by focusing the frame, for example.

In step S205, the control section 100 is configured to determine whether or not an inner peripheral part of the frame is bright. That is, the detected frame is herein the window frame as in FIG. 3 or 4 or the like, and it is determined whether or not the image is in a state in which an outside is seen from an inside of a building or the like. In a case in which the frame is the window frame or the like, in which the outside is seen from the inside, and in which it is bright outside as on a sunny day, an inside of the frame is generally brighter than the frame. When it is determined that the inner peripheral part is not bright, the processing proceeds to step S203, and it is concluded that the distance to the main subject is unknown. Conversely, when it is determined that the inner peripheral part is bright, the processing proceeds to step S206. For determination of whether or not the inner peripheral part is bright, a threshold value at which it is determined that the part is bright may be preset in the control section 100. Also, when a center part (or the main subject) has a brightness value within a predetermined reference range with reference to a brightness value of the inner peripheral part of the frame, it may be determined that the center part (or the main subject) is bright. In this manner, comparison of brightness between the inside of the frame and the frame may be performed with use of an existing technique. Also, a position of the inner peripheral part of the frame may be determined by the control section 100 in accordance with a preset determining method.

In step S206, the control section 100 is configured to determine whether or not the center part of the captured image is bright. When the center part is bright, it is estimated that the main subject at the center part is outside the window or the like as illustrated in FIG. 3. When the center part is bright, the processing proceeds to step S207. In step S207, the control section 100 is configured to determine that the main subject is farther than the frame. The main subject distance distribution determining processing thereafter ends, and the processing returns to the camera control processing.

When it is determined in step S206 that the center part of the captured image is not bright, that is, that the center part is dark, the processing proceeds to step S208. The case in which the center part is dark is a case in which the main subject at the center part is inside the window or the like as illustrated in FIG. 4. In step S208, the control section 100 is configured to determine that the main subject is nearer than the frame. The main subject distance distribution determining processing thereafter ends, and the processing returns to the camera control processing.

Although it is determined whether the main subject is farther or nearer than the window, paying attention to a difference between sunlight in an outdoor location and artificial illumination light in an indoor location, that is, brightness at the center part, the present invention is not limited to this. For example, it may be determined that the main subject is farther than the window when the main subject is small and that the main subject is nearer than the window when the main subject is large, paying attention to a size of the main subject. Since the subject under sunlight is much brighter than the subject under artificial illumination light, it may be determined whether the subject is outside or inside the window based on an absolute value of brightness, not based on the relative comparison.

In general, in a case in which the subject located outside is photographed from an inside through a window or in which the subject located inside the window is photographed with the window therebehind under a backlight condition, for example, auto-focusing is difficult since it is difficult to detect contrast of the subject. According to the present embodiment, in a case in which the main subject cannot be focused, a frame-shaped structure such as a window frame is specified, and it is determined whether or not a photographing situation is a situation in which the auto-focusing is difficult as described above. In a case in which the photographing situation is the situation in which the auto-focusing is difficult, it is determined, based on brightness at the center part of the frame at which the subject to be focused exists, whether the subject is outside or inside the window. Since the structure such as the window frame is focused relatively easily, the distance to the window frame is derived relatively easily. The reason for this is that the window frame or the like has a significant contrast change in a boundary thereof. By determining whether the subject is far or near with reference to this window frame or the like, a range of searching a state in which the main subject is focused is narrowed at the time of the auto-focusing in the above situation. Accordingly, the difficulty in the auto-focusing is reduced.

In this manner, it is possible to provide an imaging apparatus performing distance measurement and focusing quickly as an imaging apparatus comprising an image acquiring section acquiring an image which is based on a subject image, a structure specifying section detecting a structure (window) having linear image information in a far or near direction of the captured subject or in a direction perpendicular to the far or near direction, and a main subject distance distribution determining section, wherein, in a case in which a distance to a structure straight line is acquired, and in which the main subject different from the structure comprised in the image can be specified, the main subject distance distribution determining section is configured to determine a distance to a main subject with use of an image of the structure and an image of the main subject.

For example, there is a case in which one wishes to take a picture through a window of a vehicle such as a train. In the case in which the picture is to be taken through the train window, quick photographing performance is required since the train or the like is moving. That is, it is necessary to quickly obtain a state in which a subject is focused despite the difficult situation. Even in such a scene, the technique according to the present embodiment is effective.

In this case, an object right outside the window looks moving while an object inside the window looks still, and thus such auxiliary information (image characteristic information) may be used for determination of whether the objects are far or near. Also, whether a structure and a target are far or near can be determined by shaking the imaging section (or a part thereof such as the lens and the imaging device) to confirm changes of the images. That is, when the imaging section is shaken from front to back and from side to side, the object whose image changes much is determined to be near while the object whose image changes little is determined to be far.

In general, a person who takes pictures intends to take pictures so that a line horizontal or vertical to a subject may be photographed horizontally or vertically. For this reason, the present embodiment is configured to detect a window frame based on a vertical line. Also, since each structure as well as the window frame is often constituted by straight lines, the structure is found easily by searching straight lines. Also, contrast of a structure is generally high in a captured image, a distance to the structure is obtained easily. For this reason, the distance to the subject is estimated with reference to the structure. Another subject may be used as a reference instead of the structure.

In this manner, by providing the image acquiring section acquiring an image which is based on a target scene (or a subject image), the structure specifying section, detecting a structure (window) having linear image information in a far or near direction of the captured subject or in a direction perpendicular to the far or near direction, enables distance relation in the scene to be comprehended immediately. In other words, from combination of a plurality of straight lines, the structure and distance distribution in the scene derived from the structure are determined.

It can be stated that this is a situation comprehending method for photographing (or observation) that is made available because, in many cases, a person who takes pictures stands up and sits down vertically, that is, lives under the force of gravity, lives, facing in a direction perpendicular to the force of gravity, and is often in a scene of taking pictures in the direction. Based on such a way of thinking, a determining section determining whether the person who takes pictures is standing and using the imaging apparatus or is facing in a far or near direction along the ground may be provided.

In the case in which the distance to the structure straight line is acquired, and in which the main subject different from the structure comprised in the image can be specified, it is possible to provide the imaging apparatus performing distance measurement and focusing quickly as the imaging apparatus comprising the main subject distance distribution determining section determining the distance to the main subject with use of the image of the structure and the image of the main subject. Also, the present technique can be applied to a situation comprehending apparatus comprising an image acquiring section acquiring an image of a target scene, a structure specifying section specifying a structure having linear image information in a far or near direction of the scene or in a direction perpendicular to the far or near direction, a distance acquiring section acquiring a distance to a structure straight line comprised in the structure, a main subject specifying section specifying a main subject different from the structure comprised in the image, and a main subject distance distribution determining section determining distance distribution to the main subject with use of an image of the structure and an image of the main subject. The situation comprehending apparatus can be used as a focusing apparatus focusing the main subject or an imaging apparatus having a focusing function.

In a case of using the window frame, determination of whether the subject is far or near can be performed depending on whether or not an overlapping part with the frame can be seen. That is, the distance to the subject is estimated with reference to the structure, and the distance relation between the subject and the structure can be determined by characteristics of the images of the subject and the structure other than the distance itself, such as brightness, how the images move, and how the images overlap.

Second Embodiment

A second embodiment of the present invention will be described. Here, different points from those in the first embodiment will be described. Similar or identical components to those in the first embodiment are shown with the same reference numerals, and description of the duplicate components is omitted. In the first embodiment, described is the case in which, in photographing the subject inside or outside the window, it is bright outside the window, that is, the case in which the photographing time is generally daytime, and in which the outside of the window is lit by the sunlight. Conversely, in the present embodiment, described is a case in which the photographing time is nighttime, in which it is dark outside the window, and in which a night view is spreading outside the window.

Figure 7:
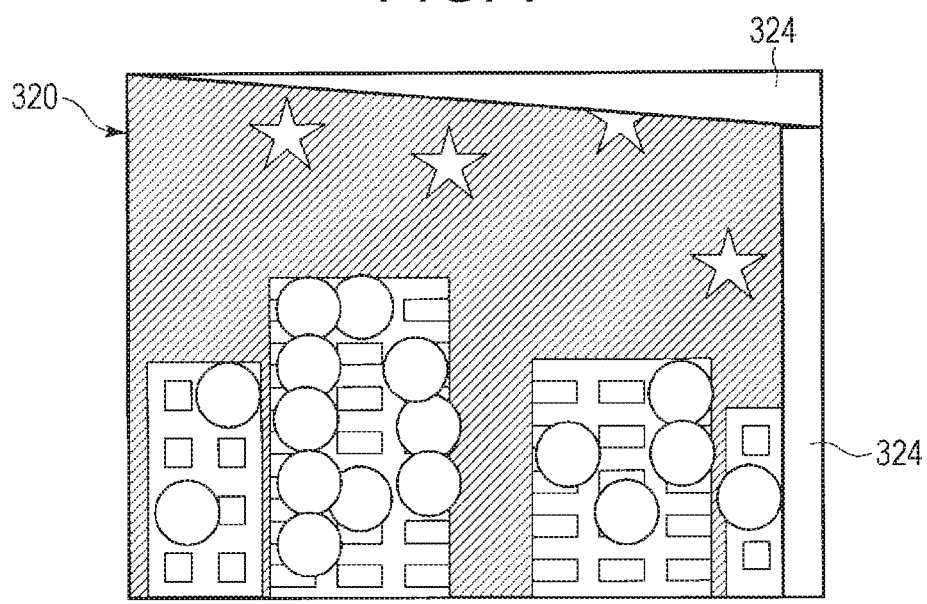
FIG. 7 describes an example of a photographing situation according to a second embodiment.
Figure 8:
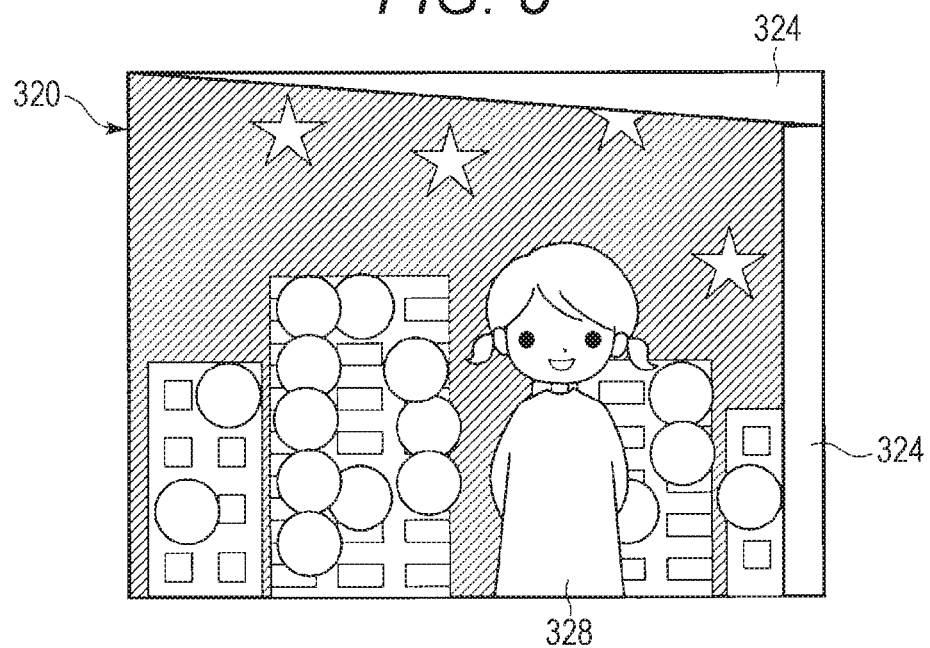
FIG. 8 describes an example of the photographing situation according to the second embodiment.

For example, as illustrated in FIGS. 7 and 8, a window frame 324 exists in an imaging region 320. Here, a case in which a picture is taken from an inside of a building in a direction in which an outside of the building is photographed is considered. The photographing time is the nighttime, and the night view is spreading outside the building behind the window frame 324. In a case illustrated in FIG. 7, a main subject is a set of outdoor buildings and signboards constituting the night view. On the other hand, in a case illustrated in FIG. 8, a main subject is a person 328 inside the building.

Figure 9:
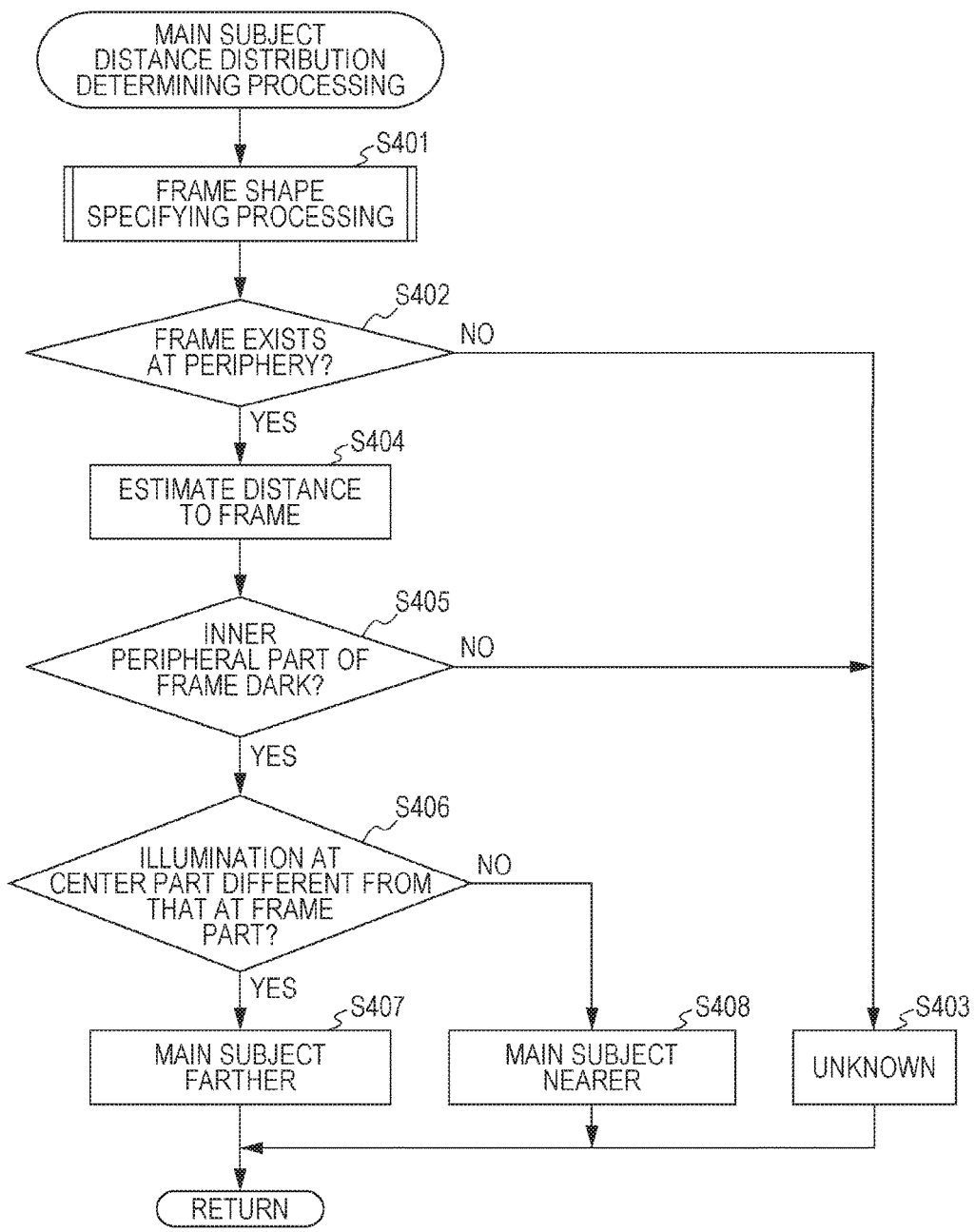
FIG. 9 is a flowchart illustrating an example of main subject distance distribution determining processing according to the second embodiment.

Camera control processing according to the present embodiment is similar to that in the case of the first embodiment. In the present embodiment, main subject distance distribution determining processing and frame shape specifying processing are different from those in the first embodiment. The main subject distance distribution determining processing according to the present embodiment will be described with reference to FIG. 9.

In step S401, the control section 100 performs the frame shape specifying processing. In step S402, the control section 100 is configured to determine whether or not a frame exists at a peripheral part of an image. When it is determined that no frame exists, the processing proceeds to S403. In step S403, the control section 100 is configured to conclude that the distance to the main subject is unknown. The main subject distance distribution determining processing thereafter ends, and the processing returns to the camera control processing.

When it is determined in step S402 that the frame exists, the processing proceeds to step S404. In step S404, the control section 100 is configured to estimate a distance from the imaging apparatus 1 to the detected frame. The distance to the frame is derived by focusing the frame, for example.

In step S405, the control section 100 is configured to determine whether or not an inner peripheral part of the frame is dark. That is, the detected frame is herein the window frame as in FIG. 7 or 8 or the like, and it is determined whether or not the image is in a state in which an outside is seen from an inside of a building or the like. In a case in which the frame is the window frame or the like, and in which the outside is seen from the inside of a building, the inner peripheral part of the frame is darker than the frame. When it is determined that the inner peripheral part is not dark, the processing proceeds to step S403, and it is concluded that the distance to the main subject is unknown. Conversely, when it is determined that the inner peripheral part is dark, the processing proceeds to step S406.

In step S406, the control section 100 is configured to determine whether or not an illumination at the center part is different from that at the frame part. When the main subject is the set of the outdoor buildings and signboards as illustrated in FIG. 7, the illumination at the center part comprising the main subject and the illumination at the frame part are different in terms of the quality such as color temperature. Conversely, when the main subject is the indoor person or object as illustrated in FIG. 8, the illumination at the center part comprising the main subject and the illumination at the frame part are similar in terms of the quality. When the illumination at the center part and the illumination at the frame part are different, the processing proceeds to step S407. In step S407, the control section 100 is configured to determine that the main subject is farther than the frame. The main subject distance distribution determining processing thereafter ends, and the processing returns to the camera control processing.

When the illumination at the center part and the illumination at the frame part are not different in step S406, the processing proceeds to step S408. In step S408, the control section 100 is configured to determine that the main subject is nearer than the frame. The main subject distance distribution determining processing thereafter ends, and the processing returns to the camera control processing. Meanwhile, instead of the above processing, it may be determined in step S406 whether or not the center part is dark, and when the center part is dark, the processing may proceed to step S408.

Next, the frame shape specifying processing performed in step S401 will be described. The frame shape specifying processing performed here may be similar to the frame shape specifying processing in the first embodiment described with reference to FIG. 6. However, in a case in which the composition of the image is one as in FIG. 7 or 8, the window frame 324 cannot be specified by the frame shape specifying processing in the first embodiment described with reference to FIG. 6. Here, a processing method enabling the window frame 324 to be specified even in the cases of FIGS. 7 and 8 will be shown. It is to be understood that the method shown here can be used in combination with the method in the first embodiment.

Figure 10:
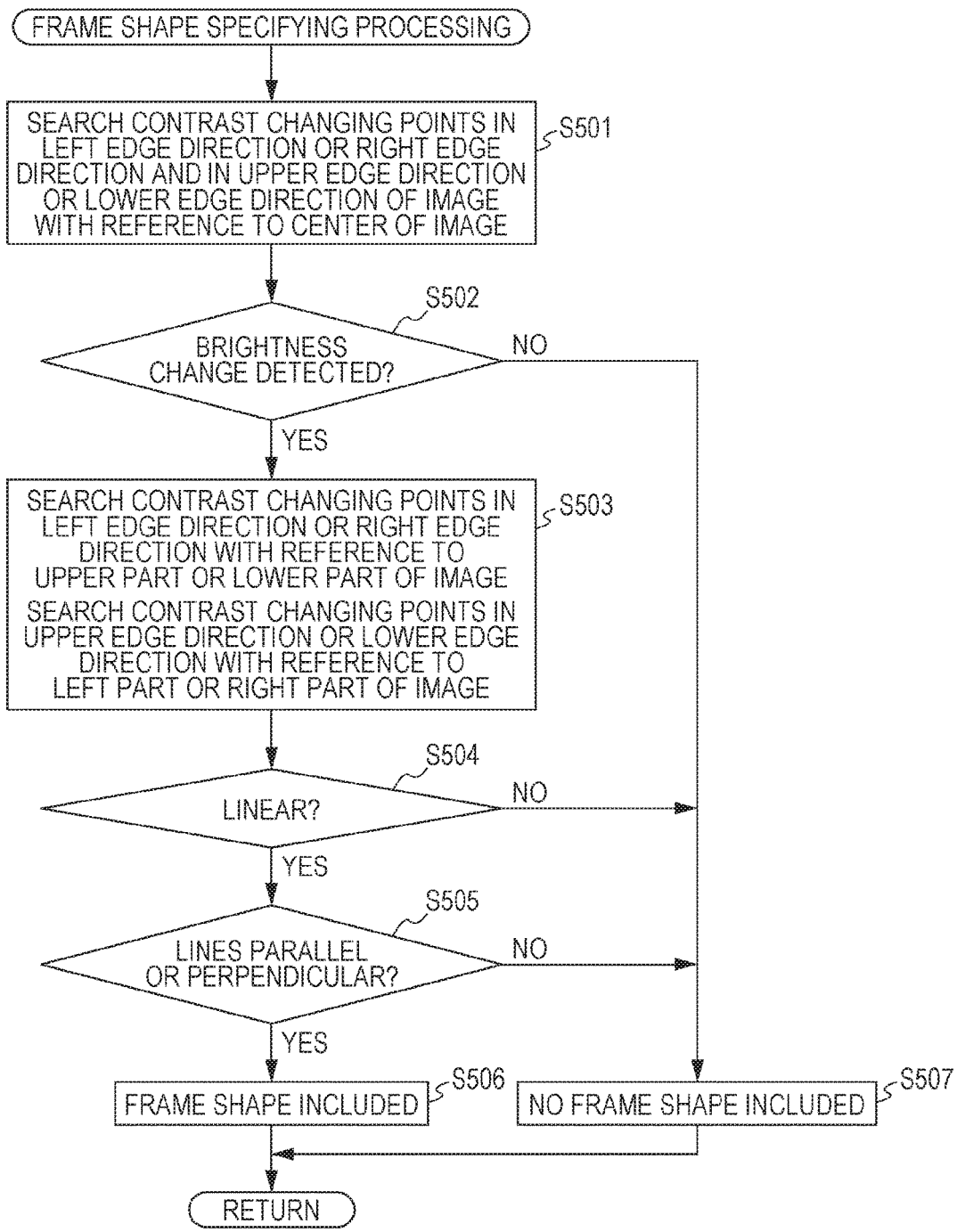
FIG. 10 is a flowchart illustrating an example of frame shape specifying processing according to the second embodiment.

The frame shape specifying processing according to the present embodiment will be described with reference to FIG. 10. In step S501, the control section 100 searches contrast changing points in a left edge direction or a right edge direction and in an upper edge direction or a lower edge direction of an image, with reference to the center of the image.

In step S502, the control section 100 is configured to determine whether or not the brightness change has been detected. When no brightness change is detected, the processing proceeds to step S507. Conversely, when the brightness change is detected, the processing proceeds to step S503.

In step S503, the control section 100 is configured to search the contrast changing points in the left edge direction or the right edge direction, setting an upper part or a lower part of the image as a reference in a similar manner to that in step S501. The control section 100 is also configured to search the contrast changing points in the upper edge direction or the lower edge direction, setting a left part or a right part of the image as a reference.

In step S504, the control section 100 is configured to determine whether or not the contrast changing points are arranged linearly when the found contrast changing points are connected. When each line is not linear, the processing proceeds to step S507. Conversely, when it is linear, the processing proceeds to step S505. In step S505, the control section 100 is configured to determine whether or not the plurality of straight lines obtained by connecting the contrast changing points are parallel or perpendicular. When the straight lines are not parallel or perpendicular, the processing proceeds to step S507. Conversely, when they are parallel or perpendicular, the processing proceeds to step S506. Here, determination of whether or not they are parallel or perpendicular does not need to be strict determination but may be determination of whether or not they are approximately parallel or approximately perpendicular.

In step S506, the control section 100 is configured to conclude that the image comprises a frame shape. The frame shape specifying processing thereafter ends, and the processing returns to the main subject distance distribution determining processing. When the straight lines obtained by connecting the contrast changing points are parallel or perpendicular, it is estimated that these contrast changing points represent window frames, poles, ceilings, beams, and the like. The reason for this is that the window frames, the poles, the ceilings, the beams, and the like are arranged to be parallel to or perpendicular to each other. In general, a person who takes pictures performs photographing in consideration of parallel and perpendicular directions. Accordingly, the imaging apparatus 1 may be configured to determine whether or not the straight lines showing the contrast changing points are arranged to be parallel or perpendicular and to conclude that the image comprises a frame shape when they are arranged to be parallel or perpendicular.

Also, in step S507, the control section 100 is configured to conclude that the image comprises no frame shape. The frame shape specifying processing thereafter ends, and the processing returns to the main subject distance distribution determining processing.

According to the present embodiment, in a case in which auto-focusing is generally considered to be difficult, that is, a case in which the photographing time is nighttime, and in which a night view is photographed through a window, or in which an indoor subject is photographed with the night view therebehind, it can be determined whether the subject is outside or inside the window. The structure such as the window frame is focused relatively easily. Thus, by determining whether the subject is far or near with reference to this window frame or the like, the difficulty in the auto-focusing in the above situation can be reduced. That is, the distance to the subject is estimated with reference to the structure, and the distance relation between the subject and the structure can be determined by brightness of the structure and the main subject, how the images of the structure and the main subject move, and how the images overlap in a similar manner to that in the previous embodiment. Indoor illumination components may be used. A spectral component of an illumination lighting an inside of the structure and a spectral component of an illumination lighting the main subject are compared, and when they are the same, it can be determined that the main subject is in front of the structure, and when they are different, it can be determined that the main subject is outside the structure. Such comparison targets are collectively referred to as image characteristics.

Third Embodiment

A third embodiment of the present invention will be described. Here, different points from those in the first embodiment will be described. Similar or identical components to those in the first embodiment are shown with the same reference numerals, and description of the duplicate components is omitted. In the first embodiment, described is the example of, in photographing the subject inside or outside the window, estimating the distance to the main subject with reference to the window frame. Conversely, in the present embodiment, described is an example of, in an indoor location, estimating a distance to the main subject with reference to a structure existing continuously from a near side to a far side. A technique according to the present embodiment can be used in a case in which contrast of the main subject is low, and in which focusing by means of auto-focusing is difficult, such as a backlight case. A structure straight line in a building such as a line on a ceiling described herein is a typical example of a structure having a straight line having obvious specific rules such as having an equal width, extending in a far or near direction, and having information in the far or near direction and in a direction perpendicular to the far or near direction.

Figure 11:
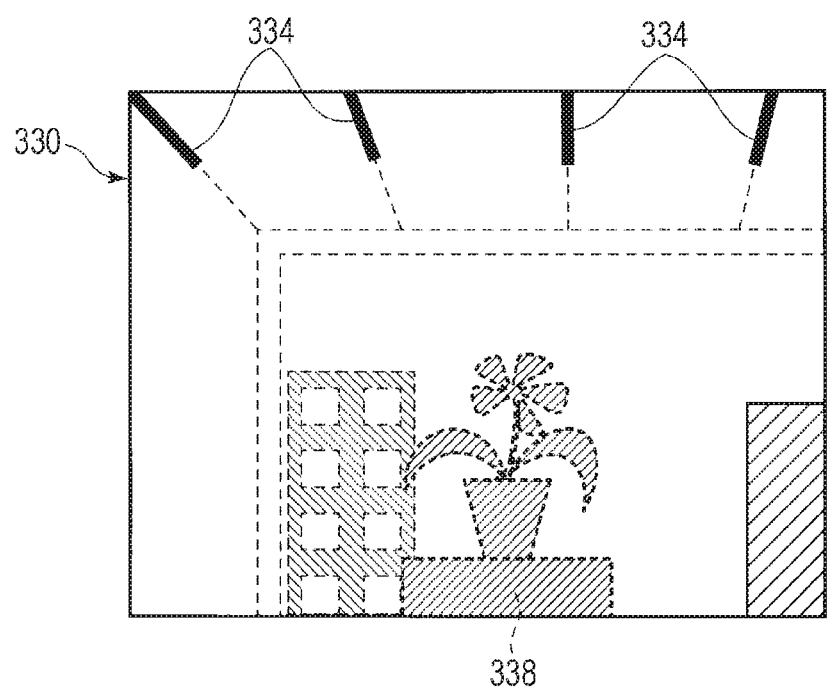
FIG. 11 describes an example of a photographing situation according to a third embodiment.

For example, as illustrated in FIG. 11, a case in which structures 334, such as patterns on a ceiling and beams, existing continuously from the nearside to the far side, exist in an imaging region 330, is considered. The structures 334 existing continuously from the near side to the far side look radial so as to be focused on one vanishing point in perspective. Also, since each of the structures 334 exists continuously from the near side to the far side, contrast differs with a distance thereof. By comparing contrast of this structure 334 with contrast of a main subject 338, a distance to the main subject is estimated.

Figure 12:
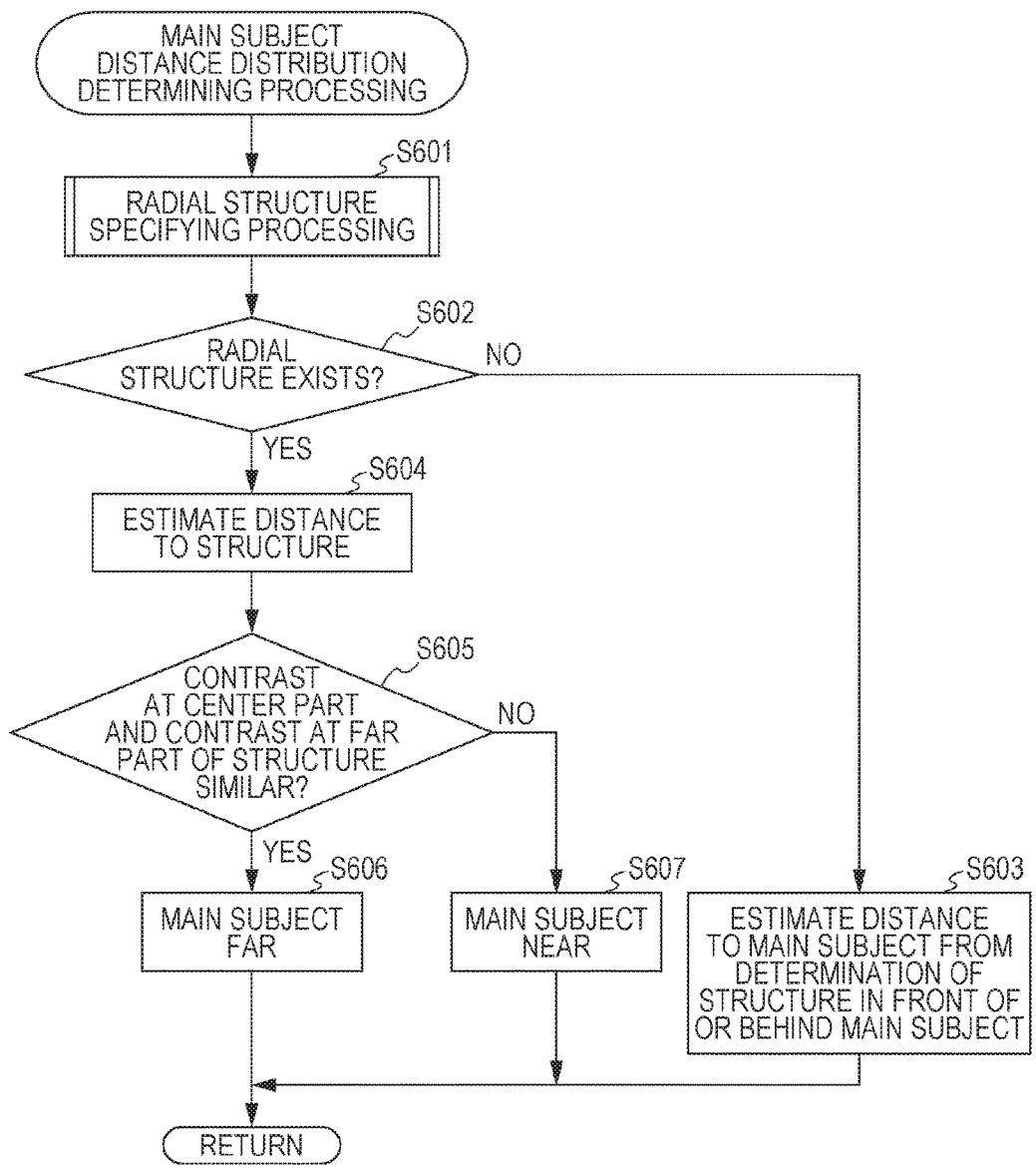
FIG. 12 is a flowchart illustrating an example of main subject distance distribution determining processing according to the third embodiment.

Camera control processing according to the present embodiment is similar to that in the case of the first embodiment. In the present embodiment, main subject distance distribution determining processing is different from that in the first embodiment. The main subject distance distribution determining processing according to the present embodiment will be described with reference to FIG. 12.

Figure 13:
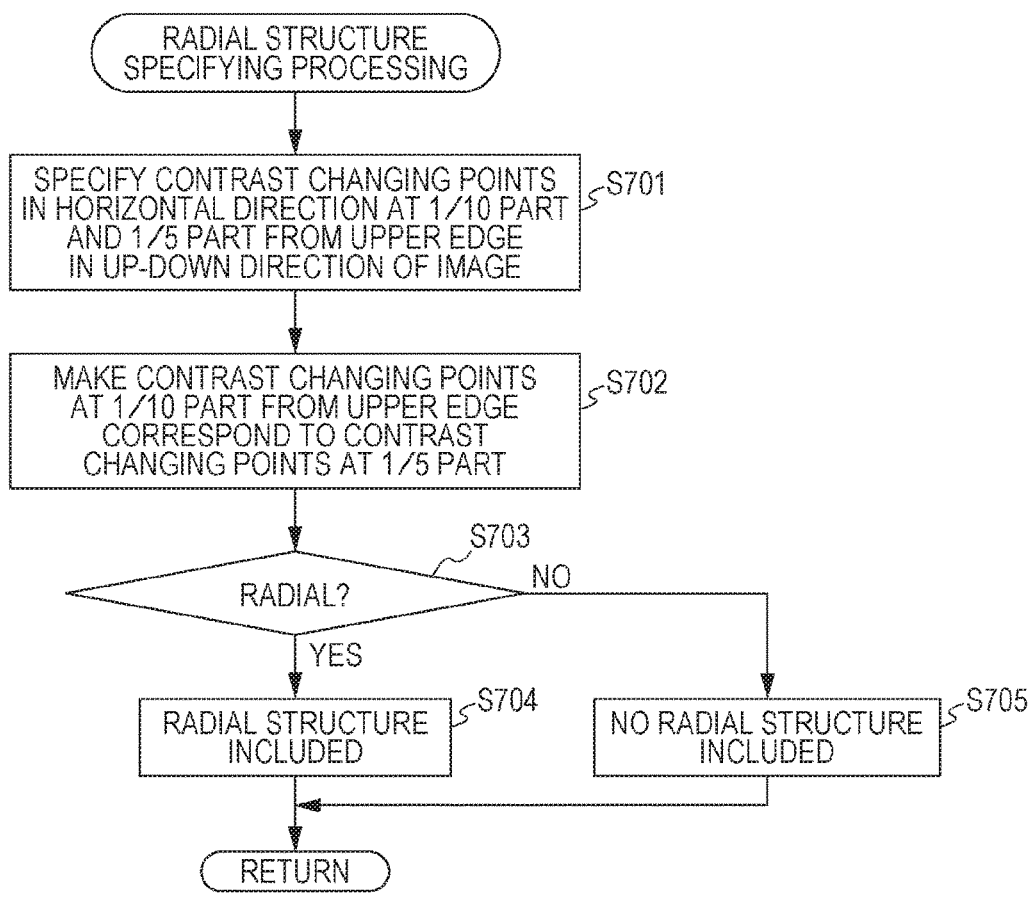
FIG. 13 is a flowchart illustrating an example of radial structure determining processing according to the third embodiment.

In step S601, the control section 100 is configured to perform radial structure specifying processing. The radial structure specifying processing will be described with reference to a flowchart illustrated in FIG. 13. In the radial structure specification, equally spaced lines look broad in width at close range and look narrow in width at long range. The radial structure specification is a method for determining characteristics of structures with use of characteristics of an image in which the lines look as if they were gradually narrowed and is a determining method with perspective. This method can be used in many scenes such as indoor ceiling and wall, a top-down view of a rooftop of a building, a side surface of a building, and a road. A road which looks as if it were gradually narrowed, an outer wall of a building extending in the far or near direction, and the like look radial. Also, a case in which actual radial lines do not exist, but in which virtual lines each connecting poles, utility poles, tip ends of buildings, and the like arranged in the far or near direction look radial, may be an applied example.

In step S701, the control section 100 is configured to specify contrast changing points in a horizontal direction at a $\frac{1}{10}$ part from an upper edge in the up-down direction of the image and specifies the contrast changing points in the horizontal direction at a $\frac{1}{5}$ part from the upper edge in the up-down direction of the image. In step S702, the control section 100 is configured to make the contrast changing points at the $\frac{1}{10}$ part from the upper edge correspond to the contrast changing points at the $\frac{1}{5}$ part from the upper edge specified in step S701. For example, at the $\frac{1}{10}$ part and the $\frac{1}{5}$ part from the upper edge, similar contrast changing points are made to correspond to each other sequentially from the center part in the right-left direction of the image to prepare a plurality of sets of the contrast changing points. In addition, straight lines each connecting the contrast changing points that have been made to correspond to each other are defined.

In step S703, the control section 100 is configured to determine whether or not the plurality of straight lines each connecting the contrast changing points defined in step S702 are arranged radially so as to be focused on one point. When the lines are radial, the processing proceeds to step S704. In step S704, the control section 100 is configured to conclude that the image comprises a radial structure. The radial structure specifying processing thereafter ends, and the processing returns to the main subject distance distribution determining processing. When it is determined in step S703 that the lines are not radial, the processing proceeds to step S705. In step S705, the control section 100 is configured to conclude that the image comprises no radial structure. The radial structure specifying processing thereafter ends, and the processing returns to the main subject distance distribution determining processing.

Returning to FIG. 12, the main subject distance distribution determining processing will be described. After the radial structure specifying processing, the processing proceeds to step S602. In step S602, the control section 100 is configured to determine whether or not a radial structure exists. That is, the control section 100 is configured to determine whether or not a radial structure has been specified in the radial structure specifying processing. When it is determined that no radial structure exists, the processing proceeds to S603. In step S603, the control section 100 is configured to conclude that the distance to the main subject with use of the radial lines is unknown. Here, a structure behind the main subject (here, it is found from how the objects overlap that the window frame is further behind) may be detected, and it may be determined from a distance to the window frame that the main subject is nearer than the window frame. This further provides an invention of a situation comprehending apparatus comprising a structure detecting section detecting a second structure existing in front of or behind the main subject. Since this way of thinking is effective regardless of whether or not radial lines are detected, using only how the main subject overlaps with structures without performing the perspective radial line detection is available. In an indoor location, many structures such as desks and lockers exist, which facilitates distance comprehension. This is a method in which how the main subject overlaps with structures, such as existing behind a desk and existing in front of a drawer, is detected, and in which distances to the desk and the drawer are thereafter considered. The main subject distance distribution determining processing thereafter ends, and the processing returns to the camera control processing.

When it is determined in step S602 that the radial structure exists, the processing proceeds to step S604. In step S604, the control section 100 estimates a distance from the imaging apparatus 1 to any position of the radial structure. Examples of the position are a middle point of the radial structure in the photographing region and a position at which contrast changes significantly at the current focused position. The distance to this position is derived by focusing the radial structure, for example.

In step S605, the control section 100 is configured to determine whether or not contrast at the center part of the image at which the main subject exists and contrast at a far part of the structure are similar. When the contrast is similar, the processing proceeds to step S606. In step S606, the control section 100 is configured to determine that the main subject is far. The main subject distance distribution determining processing thereafter ends, and the processing returns to the camera control processing. Meanwhile, in a case in which an outline of the main subject is unclear, such contrast comparison is difficult. Thus, instead of measuring absolute values of the contrast, changes in contrast may be confirmed along the outline of the main subject, or relative changes in contrast may be confirmed by changing a focused position for imaging, to compare the contrast of the main subject with the contrast of the structure and to comprehend the distance relation between the main subject and the structure.

When it is determined in step S605 that the contrast at the center part and the contrast at the far part of the structure are not similar, the processing proceeds to step S607. In step S607, the control section 100 is configured to determine that the main subject is near. The main subject distance distribution determining processing thereafter ends, and the processing returns to the camera control processing.

According to the present embodiment, when auto-focusing is difficult due to a state of an illumination, a characteristic of a subject, and the like, by determining whether the subject is far or near with reference to a distance to an indoor structure, the difficulty in the auto-focusing in the above situation can be reduced. In this manner, with reference to the structure having clear image information and distance information, contrast distribution of the image is used, and the distance relation between the structure and another object is comprehended. That is, the distance to the subject is estimated with reference to the structure, and the distance relation between the subject and the structure can be determined by brightness of the structure and the main subject, how the images of the structure and the main subject move, how the images overlap, and contrast of the structure and the main subject (these are regarded as the image characteristics) in a similar manner to that in the previous embodiment. Also, a second structure may be found behind the main subject, and how the main subject overlaps with the second structure may be determined and may be used as the image characteristic. This case can provide a situation comprehending apparatus comprising an image acquiring section acquiring an image of a target scene, a structure specifying section specifying a structure comprising linear image information in a far or near direction of the scene or in a direction perpendicular to the far or near direction, a distance acquiring section acquiring a distance to a structure straight line comprised in the structure, a main subject specifying section specifying a main subject different from the structure comprised in the image, and a distance distribution determining section determining an image of a second structure with use of an image of the structure and an image of the main subject and determining a distance to the target from characteristics of the images of the main subject and the second structure. In the present embodiment, the posture determining section 230 is not necessarily an essential component.

It is to be understood that the first to third embodiments may be used in combination with each other. For example, based on photographing time, an average brightness value of the captured image, and the like, the main subject distance distribution determining processing described in the first embodiment or the main subject distance distribution determining processing described in the second embodiment may be used selectively. Also, the main subject distance distribution determining processing operations in the first to third embodiments may be performed sequentially so as to select an optimal estimated value of the distance to the main subject.

Mainly each control operation described with reference to the flowchart out of the techniques described in each embodiment can be achieved with use of a program. This program can be recorded in a recording medium or a recording section. Various methods for recording the program in the recording medium or the recording section can be used. The program may be recorded before shipping the product, may be recorded when the distributed recording medium is used, or may be recorded by downloading via the Internet.

The above configuration of the imaging apparatus 1 can be applied in an information mobile terminal such as a smartphone and a tablet terminal. Another example of the information mobile terminal is a wearable terminal. Such a technique is particularly important in the wearable device, in which operations by a person who takes pictures are not easy. Also, the configuration can also be used effectively in a monitoring camera for use inside a structure, an industrial device for inspections, and an industrial endoscope, not only in a consumer camera. In a microscopic world, in which the structure is not a building but a tool, a jig, or a treatment tool, the configuration can be applied in a microscope and various observation devices for medical use. The above configuration of the imaging apparatus 1 can also be used for inspections (e.g., an inspection for occurrence of temporal change), observations, and the like of a construction such as a building, a house, and a bridge. In this case, the configuration can be used effectively in focusing when it can be defined that the construction extends in the far or near direction, instead of focusing under the force of gravity. It is to be understood that the configuration can be used not only in focusing but also for a method and apparatus for immediately comprehending distance relation and distance distribution between a structure and another object. The lens unit 212 may be a replaceable lens unit or a lens unit integrally attached to the imaging section 214.

Also, instead of detecting the posture of the imaging apparatus 1 based on the posture determining section 230, the posture of the imaging apparatus 1 may be estimated based on subject information in an image acquired by the image acquiring section 102.

Also, in the case of determining the distance distribution to the main subject with use of the image of the frame shape and the image of the main subject, the frame shape does not necessarily comprise structure straight lines.

Also, the main subject distance distribution determining section 124 may be configured to determine that the main subject is located farther than the frame shape when the illumination at the inner peripheral part of the frame shape is different from that at the main subject and that the main subject is located nearer than the frame shape when the illumination at the inner peripheral part of the frame shape is the same as that at the main subject. For determination of whether or not the illuminations are the same, it may be determined that "the illuminations are the same" when the brightness values are within a predetermined range and that "the illuminations are different" when the brightness values are out of the predetermined range. That is, for the determination that the illuminations are the same, the illuminations do not necessarily have to be identical in a strict sense. A reference for the determination that the illuminations are the same can be preset in the control section 100.

Meanwhile, the above embodiments of the present invention comprises the following invention.

[1] An imaging apparatus comprising a processor comprising hardware, wherein the processor is configured to implement:
an image acquiring section configured to acquire an image which is based on a subject image;
a structure specifying section configured to specify a structure comprised in the image;
a distance acquiring section configured to acquire a structure distance which is a distance to the structure;
a main subject determining section configured to determine a state of a main subject comprised in the image; and
a main subject distance determining section configured to determine an index of a distance to the main subject with use of the structure distance based on the state of the main subject.

[2] The imaging apparatus according to [1], wherein the state of the main subject comprises at least anyone out of brightness of the main subject, a characteristic of illumination light to the main subject, and contrast of the main subject.

[3] The imaging apparatus according to [1], wherein the structure comprises a window frame.

[4] The imaging apparatus according to [1], wherein the processor is configured to further implement an auto-focus control section controlling an auto-focus operation with use of the index of the distance to the main subject.

[5] The imaging apparatus according to [4], wherein the auto-focus control section is configured to reduce a searching range for focusing with use of the index of the distance to the main subject.

[6] A subject distance estimating method comprising:
acquiring an image which is based on a subject image;
specifying a structure comprised in the image;
acquiring a structure distance which is a distance to the structure;
determining a state of a main subject comprised in the image; and
determining an index of a distance to the main subject with use of the structure distance based on the state of the main subject.

[7] A computer readable device for subject distance estimation having a computer execute operations comprising:
acquiring an image which is based on a subject image;
specifying a structure comprised in the image;
acquiring a structure distance which is a distance to the structure;
determining a state of a main subject comprised in the image; and
determining an index of a distance to the main subject with use of the structure distance based on the state of the main subject.

What is claimed is:

1. A situation comprehending apparatus comprising:
one or more processors comprising hardware, wherein the one or more processors are configured to implement:
an image acquiring section configured to acquire an image of a target scene;
a structure specifying section configured to specify a structure in the image of the target scene, wherein the structure has linear image information in a far or near direction of the target scene or in a direction perpendicular to the far or near direction;
a distance acquiring section configured to acquire a distance from an imaging sensor to a structure straight line comprising the structure;
a main subject specifying section configured to specify a main subject in the image of the target scene, wherein the main subject is different from the structure; and
a distance distribution determining section configured to determine a distance distribution from the imaging sensor to the main subject based on a portion of the image of the target scene corresponding to the structure and a portion of the image of the target scene corresponding to the main subject.

2. The situation comprehending apparatus according to claim 1,
wherein the distance distribution determining section is configured to determine a distance relation of the main subject with reference to the distance from the imaging sensor to the structure straight line through characteristic comparison between the portion of the image of the target scene corresponding to the structure and the portion of the image of the target scene corresponding to the main subject.

3. The situation comprehending apparatus according to claim 1,
wherein the distance distribution determining section is configured to determine a distance relation of the main subject with reference to the distance from the imaging sensor to the structure straight line based on contrast of the portion of the image of the target scene corresponding to the structure and contrast of the portion of the image of the target scene corresponding to the main subject.

4. A focusing apparatus comprising:
one or more processors comprising hardware, wherein the one or more processors are configured to implement:
an image acquiring section configured to acquire an image;

a frame shape specifying section configured to specify a frame shape in the image;
a distance acquiring section configured to acquire a distance from an image sensor to the frame shape; a main subject specifying section configured to specify a main subject different from the frame shape in the image; and
a distance distribution determining section configured to determine distance distribution to the main subject based on a portion of the image corresponding to the frame shape and a portion of the image corresponding to the main subject.

5. The focusing apparatus according to claim 4,
wherein the frame shape specifying section is configured to specify the frame shape based on a structure straight line in the image.

6. The focusing apparatus according to claim 4,
wherein the distance distribution determining section is configured to determine that:
the main subject is located farther from the image sensor than the frame shape in a case in which an inner peripheral part of the frame shape and the main subject are determined to be brighter than a first predetermined threshold; and
the main subject is located nearer to the image sensor than the frame shape in a case in which the inner peripheral part of the frame shape is determined to be brighter than the first predetermined threshold and in which the main subject is determined to be darker than a second predetermined threshold that is the same as or lower than the first predetermined threshold.

7. The focusing apparatus according to claim 4,
wherein the distance distribution determining section is configured to determine that:
the main subject is located farther from the image sensor than the frame shape in a case in which an inner peripheral part of the frame shape and the main subject are determined to be darker than a first predetermined threshold; and
the main subject is located nearer to the image sensor than the frame shape in a case in which the inner peripheral part of the frame shape is determined to be darker than the first predetermined threshold and in which the main subject is determined to be brighter than a second predetermined threshold that is the same as or higher than the first predetermined threshold.

8. The focusing apparatus according to claim 4,
wherein the distance distribution determining section is configured to determine that:
the main subject is located farther from the image sensor than the frame shape in a case in which an illumination at an inner peripheral part of the frame shape and an illumination at the main subject are different; and
the main subject is located nearer to the image sensor than the frame shape in a case in which the illumination at the inner peripheral part of the frame shape and the illumination at the main subject are similar.

9. A focusing apparatus for controlling an imaging apparatus based on processing of an image captured by the imaging apparatus, the focusing apparatus comprising:
one or more processors comprising hardware, wherein the one or more processors are configured to implement:
a main subject specifying section configured to specify a main subject shown in the image;
a structure specifying section configured to specify a linear structure shown in the image, wherein the linear structure is different from the main subject;
a distance acquiring section configured to acquire a reference distance from the imaging apparatus to the linear structure;
a main subject distance distribution determining section configured to:
compare a similarity of one or more image characteristic of a portion of the image corresponding to the linear structure with a portion of the image corresponding to the main subject; and
estimate an estimated distance from the imaging apparatus to the main subject relative to the reference distance based on a result of comparing the similarity of the one or more image characteristic of the portion of the image corresponding to the main subject with the portion of the image corresponding to the linear structure; and
a control section configured to control a focusing mechanism of the imaging apparatus based on the estimated distance from the imaging apparatus to the main subject relative to the reference distance.

10. The focusing apparatus according to claim 9,
wherein specifying the linear structure shown in the image comprises:
specifying a first structure shown in the image, wherein the first structure is between the main subject and a first edge of the image, and wherein the first structure is approximately parallel to the first edge;
specifying a second structure shown in the image, wherein the second structure is between the main subject and a second edge of the image, and wherein the second edge is parallel to the first edge, and wherein the second structure is approximately parallel to the first edge; and
specifying the first structure and the second structure as the linear structure.

11. The focusing apparatus according to claim 10,
wherein specifying the first structure comprises specifying a first pair of contrast change points in the image, wherein the first pair of contrast change points is between the first edge and a first line parallel to the first edge.

12. The focusing apparatus according to claim 11,
wherein specifying the second structure comprises specifying a second pair of contrast change points, wherein the second pair of contrast change points between the second edge and a second line parallel to the second edge.

13. The focusing apparatus according to claim 10,
wherein comparing the similarity of the one or more image characteristic of the portion of the image corresponding to the linear structure with the portion of the image corresponding to the main subject comprises:
comparing a first brightness of the portion of the image corresponding to the linear structure with a second brightness of the portion of the image corresponding to the main subject.

14. The focusing apparatus according to claim 13,
wherein comparing the first brightness of the portion of the image corresponding to the linear structure with the second brightness of the portion of the image corresponding to the linear structure comprises:
determining whether the first brightness of the portion of the image corresponding to the linear structure is bright relative to a preset threshold value; and after determining that the first brightness of the portion of the image corresponding to the linear structure is bright relative to the preset threshold value, determining whether the second brightness of the portion of the image corresponding to the main subject is within a preset reference range including the first brightness.

15. The focusing apparatus according to claim 14, wherein estimating the estimated distance from the imaging apparatus to the main subject relative to the reference distance comprises:
   determining that the estimated distance from the imaging apparatus to the main subject is longer than the reference distance based on a determination that the second brightness of the portion of the image corresponding to the main subject is within the preset reference range including the first brightness; and
   determining that the estimated distance from the imaging apparatus to the main subject is shorter than the reference distance based on a determination that the second brightness of the portion of the image corresponding to the main subject is less than the preset reference range including the first brightness.

16. The focusing apparatus according to claim 9, wherein specifying the linear structure shown in the image comprises:
   specifying a first structure in a first edge direction of the image with reference to the center of the image;
   specifying a second structure in a second edge direction of the image with reference to the center of the image;
   determining whether the first structure is approximately linear, and whether the second structure is approximately linear;
   determining whether the first structure and the second structure have one of an approximately parallel relationship or an approximately perpendicular relationship; and
   specifying the first structure and the second structure as the linear structure in response to determining that: the first structure is approximately linear; the second structure is approximately linear; and the first structure and the second structure have one of an approximately parallel relationship or an approximately perpendicular relationship.

17. The focusing apparatus according to claim 16, wherein specifying the first structure comprises specifying contrast change points in the first edge direction of the image with reference to the center of the image; and
wherein specifying the second structure comprises specifying contrast change points in the second edge direction of the image with reference to the center of the image.

18. The focusing apparatus according to claim 9, wherein specifying the linear structure shown in the image comprises:
   specifying a first contrast change point at approximately a first distance from an edge of the image, and a second contrast change point at approximately the first distance from the edge of the image;
   specifying a third contrast change point at approximately a second distance from the edge of the image, and a fourth contrast change point at approximately the second distance from the edge of the image;
   specifying a first line approximately connecting the first contrast change point and the third contrast change point, and a second line approximately connecting the second contrast change point and the fourth contrast change point, determining whether the first line and the second line are arranged approximately radially so as to be focused on one point; and
   specifying the first contrast change point, the second contrast change point, the third contrast change point and the fourth contrast change point as the linear structure in response to determining that the first line and the second line are arranged approximately radially so as to be focused on the one point.

19. The focusing apparatus according to claim 18, wherein comparing the similarity of the one of more image characteristic of the portion of the image corresponding to the main subject with the portion of the image corresponding to the linear structure comprises:
   determine whether contrast of the portion of the image corresponding to the main subject is similar to contrast of the portion of the image corresponding to the linear structure.

20. The focusing apparatus according to claim 19, wherein estimating the estimated distance from the imaging apparatus to the main subject relative to the reference distance comprises:
   determining that the estimated distance from the imaging apparatus to the main subject is longer than the reference distance based on a determination that the contrast of the portion of the image corresponding to the main subject is similar to contrast of the portion of the image corresponding to the linear structure; and
   determining that the estimated distance from the imaging apparatus to the main subject is shorter than the reference distance based on a determination that the contrast of the portion of the image corresponding to the main subject is not similar to the contrast of the portion of the image corresponding to the linear structure.

21. An imaging apparatus comprising:
the focusing apparatus according to claim 9; and
the focusing mechanism.

* * * * *